US008605736B2

(12) United States Patent
Hu et al.

(10) Patent No.: US 8,605,736 B2
(45) Date of Patent: Dec. 10, 2013

(54) METHOD, SYSTEM AND APPARATUS FOR HETEROGENEOUS ADDRESSING MAPPING

(75) Inventors: Ying Hu, Shenzhen (CN); Yijun Yu, Shenzhen (CN); Yu Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 888 days.

(21) Appl. No.: 12/761,265

(22) Filed: Apr. 15, 2010

(65) Prior Publication Data
US 2010/0195613 A1   Aug. 5, 2010

Related U.S. Application Data

(63) Continuation of application No. PCT/CN2008/072798, filed on Oct. 23, 2008.

(30) Foreign Application Priority Data

Nov. 2, 2007   (CN) .......................... 2007 1 0166747

(51) Int. Cl.
*H04L 12/28* (2006.01)
*H04L 12/56* (2011.01)

(52) U.S. Cl.
USPC .......................................................... 370/401

(58) Field of Classification Search
None
See application file for complete search history.

(56) References Cited

U.S. PATENT DOCUMENTS

| | | | |
|---|---|---|---|
| 6,192,055 B1 | 2/2001 | Räsänen | |
| 8,085,758 B2 * | 12/2011 | Ramachandran et al. | 370/352 |
| 8,140,676 B2 * | 3/2012 | Davies et al. | 709/225 |
| 2006/0095954 A1 | 5/2006 | Buckley et al. | |
| 2006/0245395 A1 | 11/2006 | Jain et al. | |
| 2007/0291734 A1 * | 12/2007 | Bhatia et al. | 370/352 |
| 2008/0039104 A1 * | 2/2008 | Gu et al. | 455/445 |
| 2011/0280155 A1 * | 11/2011 | Shi | 370/254 |
| 2011/0280254 A1 * | 11/2011 | Shi | 370/401 |
| 2013/0034055 A1 * | 2/2013 | Nenner et al. | 370/328 |

* cited by examiner

FOREIGN PATENT DOCUMENTS

FOREIGN PATENT DOCUMENTS

| | | | | |
|---|---|---|---|---|
| CN | 1196861 A | | 10/1998 | |
| CN | 101040544 A | | 9/2007 | |
| CN | EP2192800 | * | 2/2010 | .............. H04W 8/12 |
| EP | 0836339 A2 | | 4/1998 | |

OTHER PUBLICATIONS

Written Opinion of the International Searching Authority in corresponding PCT Application No. PCT/CN2008/072798 (Feb. 5, 2009).
3rd Generation Partnership Project, Technical Specification Group Core Network and Terminals: 3GPP Evolved Packet System: CT WG4 Apsects (Stage 3); Release 8, pp. 37-49 (3GPP TR 29.803 V0.4.0) (Oct. 2007).
State Intellectual Property Office of the People's Republic of China, International Search Report in International Patent Application No. PCT/CN2008/072798 (Feb. 5, 2009).

*Primary Examiner* — Ayaz Sheikh
*Assistant Examiner* — Blanche Wong
(74) *Attorney, Agent, or Firm* — Leydig, Voit & Mayer, Ltd.

(57) ABSTRACT

A method for heterogeneous addressing mapping is provided according to the embodiments of the present invention. The method includes: assigning, by an Interworking Function entity (IWF), a first identification or a first address to a Diameter protocol node; mapping a received Diameter protocol message sent from the Diameter protocol node into a Mobile Application Part (MAP) protocol message, and sending the mapped MAP protocol message to an MAP protocol node using the first address assigned by the IWF as a source address or using the first identification assigned by the IWF as a source identification. The present invention also provides a system and an apparatus for heterogeneous addressing mapping. According to the embodiments of the present invention, when the Diameter node is communicating with the MAP node via the Interworking Function entity, the method for mapping the node identification for each other as well as the addressing relationship corresponding to each identification are provided. Thus, the problems that the communication with each other cannot be realized due to different identification addressing approaches are solved.

20 Claims, 13 Drawing Sheets

METHOD, SYSTEM AND APPARATUS FOR HETEROGENEOUS ADDRESSING MAPPING

CROSS-REFERENCE TO RELATED APPLICATIONS

The application is a continuation of International application No. PCT/CN2008/072798, filed on Oct. 23, 2008, which claims priority to Chinese Patent Application No. 200710166747.4, filed on Nov. 2, 2007, both of which are hereby incorporated by reference in their entireties.

FIELD OF THE INVENTION

The present invention relates to communication field, and more specifically, to a method, system and apparatus for heterogeneous addressing mapping.

BACKGROUND

In the General Packet Radio Service (GPRS) network, a service node may access a Home Location Register via Gr interface, as shown in FIG. 1, where the Gr interface is based on a Mobile Application Part (MAP) protocol, the Home Location Register is configured to perform network access authentication, location management, etc. In the evolved GPRS network, a mobile management entity is an evolved entity of a control function of the original service node, while a home subscriber server is an evolved entity of the original Home Location Register. The mobile management entity may access the home subscriber server via S6 interface, as shown in FIG. 2, where the S6 interface is based on a Diameter protocol, the home subscriber server is configured to perform network access authentication, location management, etc.

In implementing the present invention, it is discovered that the above conventional schema encounters at least the following problems.

The service node in the original GPRS network employs Integrated Service Digital Network (ISDN) for addressing, i.e., E.164 addressing format, so that the Home Location Register may utilize the ISDN number of the service node for addressing the service node. In the evolved GPRS network, however, the mobile management entity employs a domain name approach for addressing, i.e., Fully Qualified Domain Name (FQDN) format, so that the home subscriber server may utilize the domain name resolution for addressing the mobile management entity. Thus, neither could the mobile management entity provide an Interworking Function entity (IWF) network element with the ISDN number, nor could the IWF provide the Home Location Register with the corresponding ISDN number. As a result, the Home Location Register in the original GPRS network fails to address the mobile management entity via the IWF, and similarly, the mobile management entity fails to address the Home Location Register via the IWF either.

SUMMARY

The present invention provides a method, system and apparatus for heterogeneous addressing mapping, so that the Home Location Register in the GPRS network may address the mobile management entity via the IWF when no ISDN number is available to the mobile management entity.

A method for heterogeneous addressing mapping is provided according to an embodiment of the present invention. The method includes:

assigning, by an IWF, a first identification or a first address to a Diameter protocol node;

mapping a received Diameter protocol message sent from the Diameter protocol node into an MAP protocol message, and sending the mapped MAP protocol message to an MAP protocol node using the first address assigned by the IWF as a source address or using the first identification assigned by the IWF as a source identification.

A method for heterogeneous addressing mapping is provided according to an embodiment of the present invention. The method includes:

assigning, by an IWF, a second identification or a second address to an MAP protocol node;

mapping, a received MAP message sent from the MAP protocol node into a Diameter protocol message, and sending the mapped Diameter protocol message to a Diameter protocol node using the second address assigned by the IWF as a source address or using the second identification assigned by the IWF as a source identification.

A system for heterogeneous addressing mapping is provided according to an embodiment of the present invention. The system includes: a Diameter protocol node, an MAP protocol node and an IWF, wherein the IWF is configured to assign a first identification or a first address to the Diameter protocol node, map a received Diameter protocol message sent from the Diameter protocol node into an MAP protocol message, and send the mapped MAP protocol message to the MAP protocol node using the first address assigned by the IWF as a source address or using the first identification assigned by the IWF as a source identification.

An Interworking Function entity for heterogeneous addressing mapping is provided according to an embodiment of the present invention. The Interworking Function entity includes:

a Diameter protocol mapping unit, configured to map a received Diameter protocol message of a Diameter protocol node into an MAP protocol message;

an identification setting unit, configured to use a first address assigned by the IWF as a source address or a first identification as a source identification; and a first sending unit, configured to send the mapped MAP protocol message to an MAP protocol node.

A system for heterogeneous addressing mapping is provided according to an embodiment of the present invention. The system includes:

an MAP protocol node, a Diameter protocol node and an IWF, wherein the IWF is configured to assign a second identification or a second address to the MAP protocol node, map a received MAP protocol message sent from the MAP protocol node into a Diameter protocol message, and send the mapped Diameter protocol message to the Diameter protocol node using the second address assigned by the IWF as a source address or using the second identification assigned by the IWF as a source identification.

An Interworking Function entity for heterogeneous addressing mapping is provided according to an embodiment of the present invention. The Interworking Function entity includes:

an MAP protocol mapping unit, configured to map a received MAP protocol message of an MAP protocol node into a Diameter protocol message;

an identification setting unit, configured to use a second address assigned by the IWF as a source address or a second identification as a source identification; and a fourth sending unit, configured to send the mapped Diameter protocol message to a Diameter protocol node.

Compared with the conventional art, the embodiments of the present invention enjoy the below advantages.

According to the embodiments of the present invention, when the Diameter node is communicating with the MAP node via the Interworking Function entity, the method for mapping the node identification for each other as well as the addressing relationship corresponding to each identification are provided. Thus, the problems that the communication with each other cannot be realized due to different identification addressing approaches are solved.

DETAILED DESCRIPTION

A method for heterogeneous addressing mapping is provided according to the embodiments of the present invention, in which an IWF assigns a first identification and a first address to a Diameter protocol node, and assigns a second identification and a second address to an MAP protocol node; a relationship between a first address or a first identification and the Diameter protocol is set in the IWF; and a relationship between a second address or a second identification and the MAP protocol node is set in the IWF. The first identification is an ISDN number, and the second identification is a host domain name FQDN; the first address is addressing information to which the first identification corresponds, and the second address is addressing information to which the second identification corresponds. According to different transmission protocols of specific lower layers for an MAP protocol/Diameter protocol message, the addressing information may specifically include: an IP address, a GT code or a signaling point code. The mark "/" in the present application represents two different application scenarios.

Figure 1:
FIG. 1 illustrates a schematic of a GPRS network according to the conventional art.
Figure 2:
FIG. 2 illustrates a schematic of an evolved GPRS network according to the conventional art.
Figure 3:
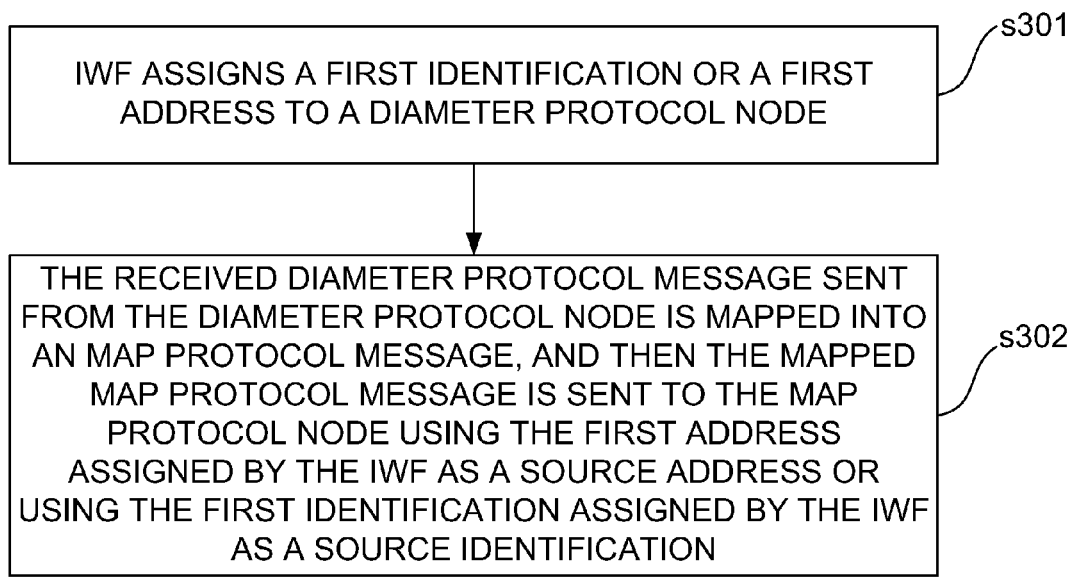
FIG. 3 illustrates a flowchart of a method for heterogeneous addressing mapping according to an embodiment of the present invention.

As illustrated in FIG. 3, a flowchart of a method for heterogeneous addressing mapping according to an embodiment of the present invention includes below steps.

Step s301: IWF assigns a first identification or a first address to a Diameter protocol node.

The first identification is an ISDN number, and the first address is addressing information for the transmission of the MAP protocol message which may specifically be an IP address, a GT code or a signaling point code.

Step s302: The received Diameter protocol message sent from the Diameter protocol node is mapped into an MAP protocol message, and then the mapped MAP protocol message is sent to the MAP protocol node using the first address assigned by the IWF as a source address or using the first identification assigned by the IWF as a source identification.

The first identification or the first address assigned by the IWF corresponds to a unique Diameter protocol node.

The IWF may also map the received MAP protocol message into a Diameter protocol message, and then send the Diameter protocol message to a Diameter protocol node to which the first address or the first identification assigned by the IWF corresponds. The received MAP protocol message mentioned above includes the first address or the first identification information assigned by the IWF as destination information. The MAP protocol message including the first address or the first identification information assigned by the IWF as destination information includes:

an information element of the destination identification information included in the MAP protocol message, wherein contents of the information element are the first address or the first identification assigned by the IWF; or/and a destination point for sending the MAP protocol message, i.e., a point for receiving the MAP protocol message by the IWF, which is the receiving point addressed by the first address or the first identification assigned by the IWF.

According to the embodiment of the present invention, a relationship between the first address or the first identification and the Diameter protocol node is configured in the IWF; or, when a message mapping for the Diameter protocol node is required, the IWF may assign a first address or a first identification of the IWF to the Diameter protocol node and assign a relationship between the first address or the first identification and the Diameter protocol node. Moreover, the IWF may record a relationship between key identification information of the Diameter protocol message or/and the mapped MAP protocol message and the Diameter protocol node, map the received MAP protocol message including the key identification information into the Diameter protocol message, and then send the mapped Diameter protocol message to the corresponding Diameter protocol node.

The key identification information is a user identification associated with the Diameter protocol message or/and the mapped MAP protocol message; or, the key identification information is a protocol session identification associated with the Diameter protocol message or/and the mapped MAP protocol message.

A source identification of the mapped MAP protocol message may specifically be as follows. The specific information element of the source identification includes a Serving GPRS Support Node (SGSN) number included in a location updating message or other messages sent by the server node; a Home Location Register (HLR) number or a Home Subscriber Server (HSS) number included in a restarting message, a location updating response message or other messages sent by an HLR or an HSS.

Figure 4:
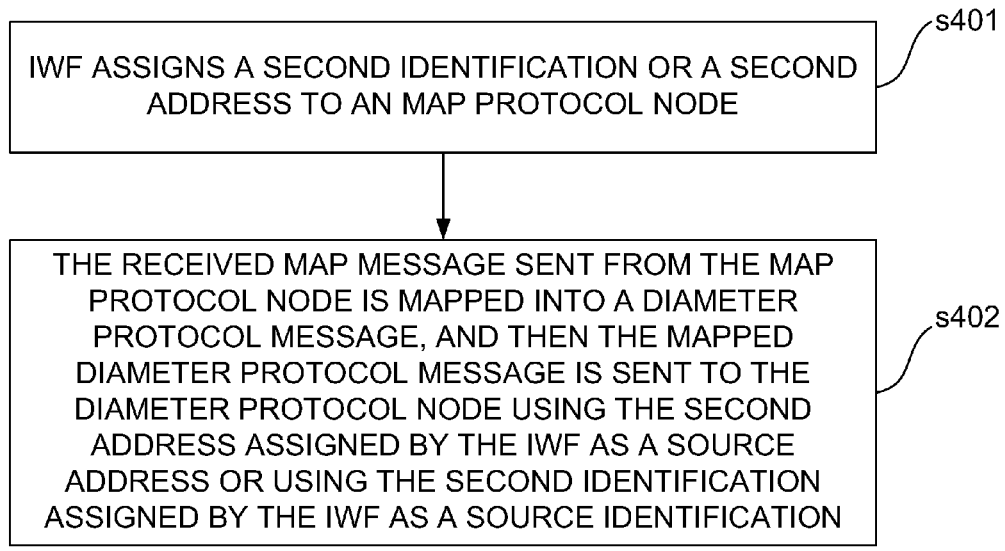
FIG. 4 illustrates a flowchart of another method for heterogeneous addressing mapping according to an embodiment of the present invention.

As illustrated in FIG. 4, a flowchart of another method for heterogeneous addressing mapping according to an embodiment of the present invention includes below steps.

Step s401: IWF assigns a second identification or a second address to an MAP protocol node.

The second identification is an FQDN, and the second address is addressing information for the transmission of the Diameter protocol message which may specifically be an IP address.

Step s402: The received MAP message sent from the MAP protocol node is mapped into a Diameter protocol message, and then the mapped Diameter protocol message is sent to the Diameter protocol node using the second address assigned by the IWF as a source address or using the second identification assigned by the IWF as a source identification.

The second identification or the second address assigned by the IWF corresponds to a unique MAP protocol node.

The IWF may also map the received Diameter protocol message into an MAP protocol message, and then send the mapped MAP protocol message to an MAP protocol node to which the second address or the second identification assigned by the IWF corresponds. The received Diameter protocol message mentioned above includes the second address or the second identification information assigned by the IWF as destination information. The Diameter protocol message including the second address or the second identification information assigned by the IWF as destination information includes:

an information element of the destination identification information included in the Diameter protocol message, wherein contents of the information element are the second address or the second identification assigned by the IWF; or/and a destination point for sending the Diameter protocol message, i.e., a point for receiving the Diameter protocol message by the IWF, which is the receiving point addressed by the second address or the second identification assigned by the IWF.

According to the embodiment of the present invention, a relationship between the second address or the second identification and the MAP protocol node is configured in the IWF; or, when a message mapping for the MAP protocol node is required, the IWF may assign a second address or a second identification of the IWF to the MAP protocol node and assign a relationship between the second address or the second identification and the MAP protocol node. Moreover, the IWF may record the MAP protocol message or/and a relationship between key identification information of the mapped Diameter protocol message and the MAP protocol node, map the received Diameter protocol message including the key identification information into the MAP protocol message, and then send the mapped MAP protocol message to the corresponding MAP protocol node.

The key identification information is a user identification associated with the MAP protocol message or/and the mapped Diameter protocol message; or, the key identification information is a protocol session identification associated with the MAP protocol message or/and the mapped Diameter protocol message.

The specific information element of the source identification in the mapped Diameter protocol message may include an information element of a source node domain name, Origin-Host AVP.

Detailed description will be made to the specific embodiments of the present invention in connection with the accompanying drawings and the embodiments.

Figure 5:
FIG. 5 illustrates a schematic of switching according to an embodiment of the present invention.

In terms of the IWF network element, the mobile management entity may be regarded as a Diameter node, and the Home Location Register may be regarded as an MAP node, as shown in FIG. 5. The interaction between the Diameter node and the IWF is based on the Diameter protocol, where the Diameter node identification, i.e., the node domain name in an FQDN format, of each of the interaction two parties is required for each other. The interaction between the MAP node and the IWF is based on the MAP protocol, where the MAP node identification, i.e., the ISDN number, of each of the interaction two parties is required for each other. The IWF assigns the corresponding MAP node identification (i.e., the ISDN number) to its served Diameter node. Thus, the IWF may be addressed via these ISDN numbers, which may also be provided to the MAP node by the IWF during the interaction with the MAP node, so that the ISDN numbers mentioned above may be utilized as a local identification. Or, the Diameter identification, i.e., the FQDN, of the Diameter node is obtained by mapping the ISDN number. Thus, the IWF may be addressed via the ISDN number mapped from the FQDN, so that these ISDN numbers may be utilized as a local identification during the interaction between the IWF and the MAP node.

During the interaction between the IWF and the MAP node, the IWF assigns the corresponding Diameter node identification (i.e., the domain name FQDN) to its served MAP node. Thus, the IWF may be addressed via these domain names FQDNs, which may also be provided to the Diameter node by the IWF during the interaction with the Diameter node, so that these domain names FQDNs may be utilized as a local identification. Or, the IWF may, according to a specific mapping rule for addressing construction, map the MAP identification (i.e., the ISDN number) of its served MAP node into a domain name FQDN, e.g., *.wellknownstring-.ISDN.*. Thus, the IWF may be addressed via these domain names FQDNs, and the IWF may utilize these domain names FQDNs as a local identification during interaction with the Diameter node.

Figure 6:
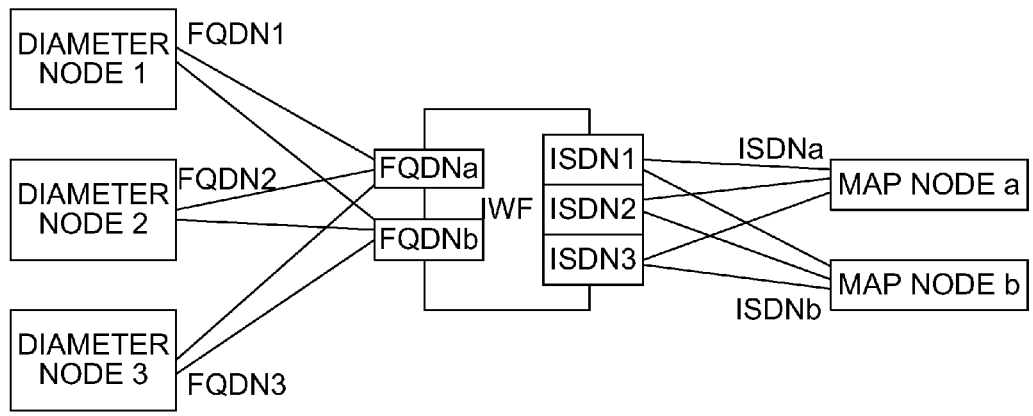
FIG. 6 illustrates a system block diagram according to a first embodiment of the present invention.

According to the first embodiment of the present invention, an IWF network element may serve one or more Diameter nodes and MAP nodes, the system block diagram of which is shown in FIG. 6. IWF assigns different ISDN numbers to different Diameter nodes, and saves the relationship between the Diameter node and the ISDN number, i.e., Diameter node 1 corresponds to ISDN1, Diameter node 2 corresponds to ISDN2, and Diameter node 3 corresponds to ISDN3. A peer that the MAP node may have addressed via this ISDN number is the IWF. Similarly, the IWF assigns different domain names to different MAP nodes, and saves the relationship between the MAP node and the domain name, i.e., MAP node a corresponds to FQDNa, MAP node b corresponds to FQDNb. A peer that the Diameter node may have addressed via this domain name is the IWF.

The second embodiment of the present invention and the third embodiment of the present invention are made on the basis of the first embodiment of the present invention to illustrate two communication situations respectively.

Figure 7:
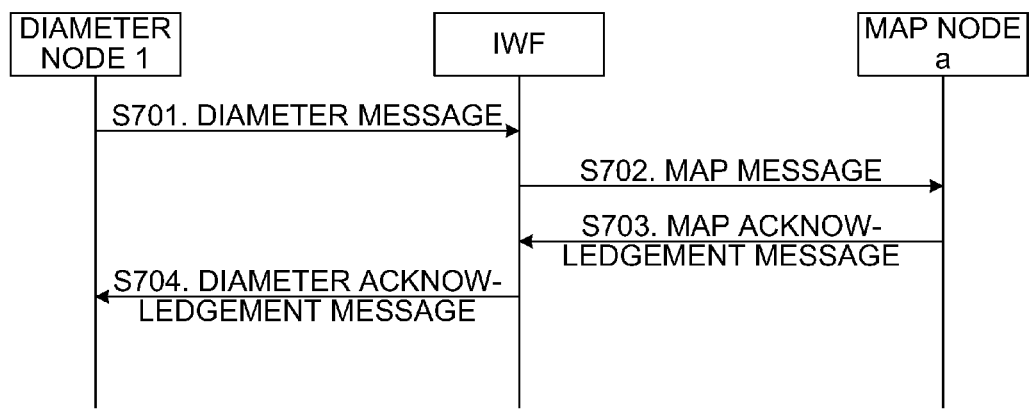
FIG. 7 illustrates a schematic flowchart of communications according to a second embodiment of the present invention.

According to the second embodiment of the present invention, Diameter node 1 initiates a communication with MAP node a, specific procedures of which are illustrated in FIG. 7, including below steps.

Step s701: Diameter node 1 sends a Diameter message to the addressing information to which FQDNa corresponds, where the source node domain name in the message (i.e., Origin-Host AVP: DiameterIdentity) is FQDN1. A destination node host domain name (i.e., Destination-Host AVP) that may also be included in the message is FQDNa, if required.

For example, the service node may send a location updating message to the Home Location Register. After a user apparatus accesses a certain service node, this service node needs to register a local ID into the Home Location Register as user location information. At this point, the source node domain name in the message is the service node domain name. Of course, the Diameter message may be extended to add a new information element for carrying the service node domain name. At this point, this extended new information element of the message may also be regarded as the source node identification.

Step s702: The IWF matches to MAP node a according to the destination node host domain name or the peer addressing information (the destination IP address) in the received Diameter message, obtains ISDNa to which MAP node a corresponds, finds the corresponding addressing information, and then forwards the message to MAP node a. The message is sent via the addressing information (signaling point code/GT code/IP address) to which ISDN1 corresponds as a source address, in which ISDN1 is derived from mapping the source node identification FQDN1 in the message. If the source node identification needs to be included in the message, ISDN1 is then included in the MAP message.

For example, the service node may send a location updating message to the Home Location Register. After a user apparatus accesses a certain service node, this service node needs to register a local ID into the Home Location Register as user location information. At this point, the message mentioned above needs to carry ISDN1 as the service node ID.

Step s703: MAP node a replies with an acknowledgement message, and carries the ISDN number of the node, i.e., ISDNa, if required. If required, MAP node a may record a peer identification in the message, i.e., ISDN1, which may be utilized for addressing when MAP node a actively contacts this peer node later.

For example, the Home Location Register may send a location updating acknowledgment message to the service node, where the ID of the Home Location Register is included in the acknowledgement message after the location information is successfully updated in the Home Location Register, and is utilized for addressing when the service node communicates with this Home Location Register later.

Step s704: The IWF maps the MAP acknowledgement message into a Diameter message and replies with it to Diameter node 1, where FQDNa is included in the message as a source node domain name, and the message can be sent with the IP address to which FQDNa corresponds as the source address.

Figure 8:
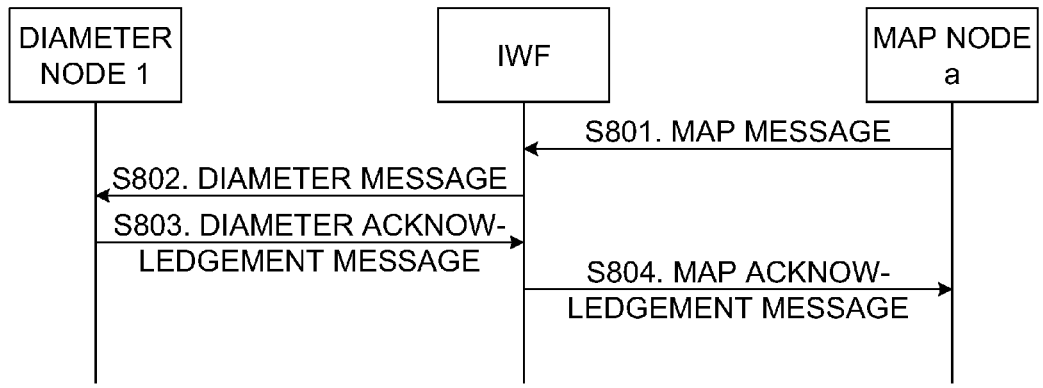
FIG. 8 illustrates a schematic flowchart of communications according to a third embodiment of the present invention.

According to the third embodiment of the present invention, MAP node a initiates a communication with Diameter node 1, specific procedures of which are illustrated in FIG. 8, including below steps.

Step s801: MAP node a sends an MAP message to the addressing information (signaling point/GT code/IP address) to which ISDN1 corresponds, where the message may carry the node number, i.e., ISDNa, if required.

For example, the Home Location Register may send a restarting message, informing of each service node that a restart occurs to itself. The ID of the Home Location Register is included in the message to determine which Home Location Register is restarted.

Step s802: The IWF matches to the corresponding Diameter node 1 according to the destination ISDN number or the peer addressing information (signaling point/GT code/IP address) in the received MAP message, obtains FQDN1 to which the Diameter node 1 corresponds, finds the corresponding addressing information, and then forwards the message to Diameter node 1. Moreover, FQDNa is populated in the source node domain name included in the Diameter message, where FQDNa is matched to the corresponding ISDNa via the source addressing information of the MAP message. Or, the ISDN number of MAP node a is included in the MAP message, and then FQDNa is derived from mapping based on ISDNa. Thus, the message may be sent with the address to which FQDNa corresponds as the source address.

For example, the Home Location Register may send a Cancel Location message. The Home Location Register may address the service node according to the ISDN number, assuming ISDN1 in the present embodiment, of the service node contained in the previously saved location information, and inform that the location information of a user is cancelled. Upon the receipt of this message by the IWF, the peer addressing information of the message, i.e., the receiving point addressing information for receiving the message by the IWF, corresponds to ISDN1, and the message is thereby matched to Diameter node 1/FQDN1. Thus, the mapped message is sent to Diameter node 1 according to the addressing information of FQDN1.

Step s803: Diameter node 1 sends an acknowledgment message to the IWF.

Step s804: The IWF maps the Diameter acknowledgment message into the MAP message, and replies with it to MAP node a, where the message is sent via a signaling point to which ISDN1 corresponds. The acknowledgment message may be forwarded and addressed using the method mentioned in the second embodiment. Or, the corresponding acknowledgment message may be sent via recorded request message information (source/destination address, request message number).

According to the fourth embodiment of the present invention, an IWF network element may serve one or more Diameter nodes and MAP nodes, as shown in FIG. 6. The addressing of the domain name may include the ISDN number, e.g., in the format of *.wellknownstring.ISDN.*. Each Diameter node connected to the IWF may have such a domain name as the Diameter node identification. The ISDN number and the domain name may map each other based on the mapping role. Therein, the domain name to which Diameter node 1 corresponds is FQDN1, and an ISDN1 number may be mapped from FQDN1. The addressing information of FQDN1 corresponds to Diameter node 1, and the addressing information of ISDN1 corresponds to the IWF. Similarly, the respective relationship of Diameter node 2 and 3 can be determined. According to another aspect, the number to which MAP node a corresponds is ISDNa, and a domain name of FQDNa may be mapped from ISDNa. The addressing information of ISDNa corresponds to MAP node a, and the addressing information of FQDNa corresponds to the IWF. MAP node b is similar to node a.

The fifth embodiment of the present invention and the sixth embodiment of the present invention are made on the basis of the fourth embodiment of the present invention to illustrate two communication situations respectively.

Figure 9:
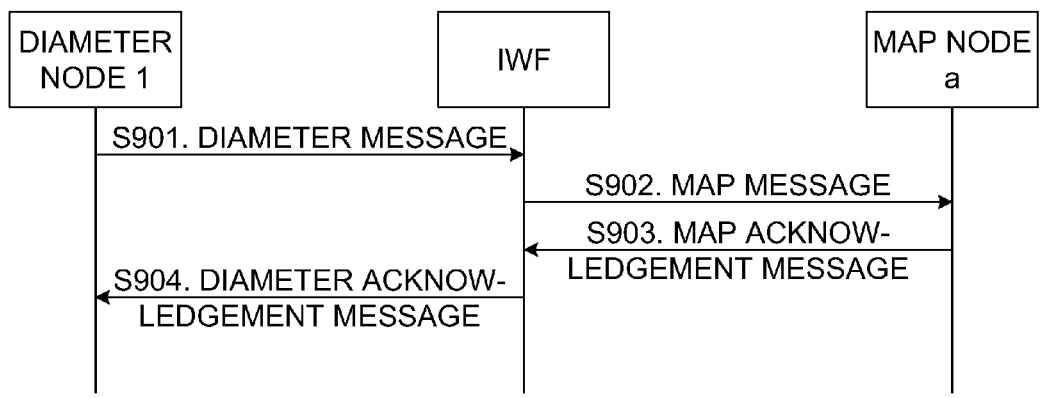
FIG. 9 illustrates a schematic flowchart of communications according to a fifth embodiment of the present invention.

According to the fifth embodiment of the present invention, Diameter node 1 initiates a communication with MAP node a, specific procedures of which are illustrated in FIG. 9, including below steps.

Step s901: Diameter node 1 sends a Diameter message to the addressing information to which FQDNa corresponds, where the source node domain name in the message (i.e., Origin-Host AVP: DiameterIdentity) is FQDN1. A destination node domain name (i.e., Destination-Host AVP) that may also be included in the message is FQDNa, if required.

Step s902: The IWF matches to ISDNa and MAP node a according to the destination node host domain name FQDNa of the received Diameter message or the peer addressing information (the destination IP address). The message is sent with the addressing information to which ISDN1 corresponds as the source address, and ISDN1 is resolved based on the source node identification FQDN1 in the message. If the source node identification needs to be included in the MAP message, then ISDN1 is populated.

Step s903: MAP node a replies with an acknowledgement message to the IWF, and carries the ISDN number of the node, i.e., ISDNa, if required. If required, MAP node a may record a peer identification in the message, i.e., ISDN1, which may be utilized for addressing when MAP node a actively contacts this peer later.

Step s904: The IWF maps the MAP acknowledgement message into a Diameter message and replies with it to Diameter node 1, where FQDNa is included in the message as a source node domain name, and the message can be sent with the address to which FQDNa corresponds as the source address.

Figure 10:
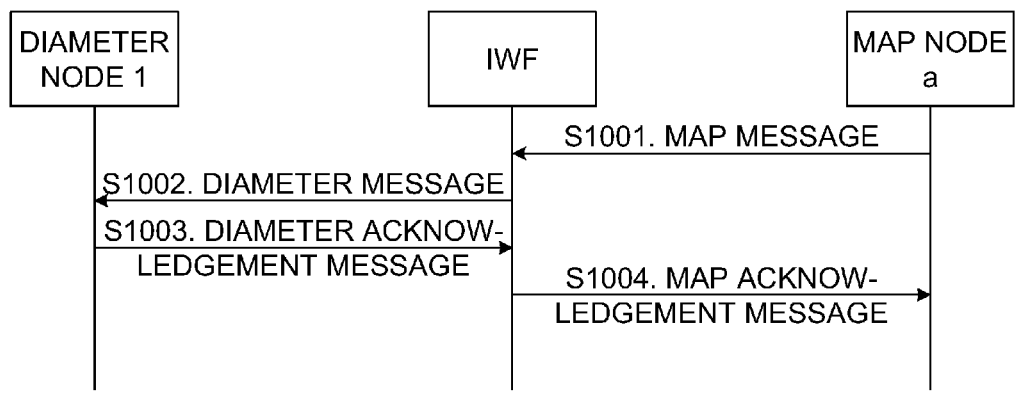
FIG. 10 illustrates a schematic flowchart of communications according to a sixth embodiment of the present invention.

According to the sixth embodiment of the present invention, MAP node a initiates a communication with Diameter node 1, specific procedures of which are illustrated in FIG. 10, including below steps.

Step s1001: MAP node a sends an MAP message to the addressing information to which ISDN1 corresponds, where the message may carry the node number, i.e., ISDNa, if required.

Step s1002: The IWF matches to the local ISDN number, i.e., ISDN1, and Diameter node 1 according to the peer addressing information (signaling point code/GT code/IP address) in the received MAP message, and constructs FQDN1 based on ISDN1. Or, the IWF constructs FQDN1 based on the destination node number ISDN1 included in the message. The IWF may then find the corresponding addressing information based on FQDN1, and forward the message to Diameter node 1. The message can be sent with the address to which FQDNa corresponds as the source address, where FQDNa is matched to the corresponding ISDNa via the source addressing information of the MAP message. Or, the source ISDN number is included in the message, and then FQDNa is derived from the construct based on ISDNa. Moreover, FQDNa is populated in the source node host domain name included in the Diameter message.

Step s1003: Diameter node 1 sends an acknowledgment message to the IWF.

Step s1004: The IWF node maps the Diameter acknowledgment message into the MAP message, and replies with it to MAP node a, where the message is sent via a signaling point to which ISDN1 corresponds.

According to the first embodiment and the fourth embodiment mentioned above, one ISDN number is required for each Diameter node served by the IWF.

Figure 11:
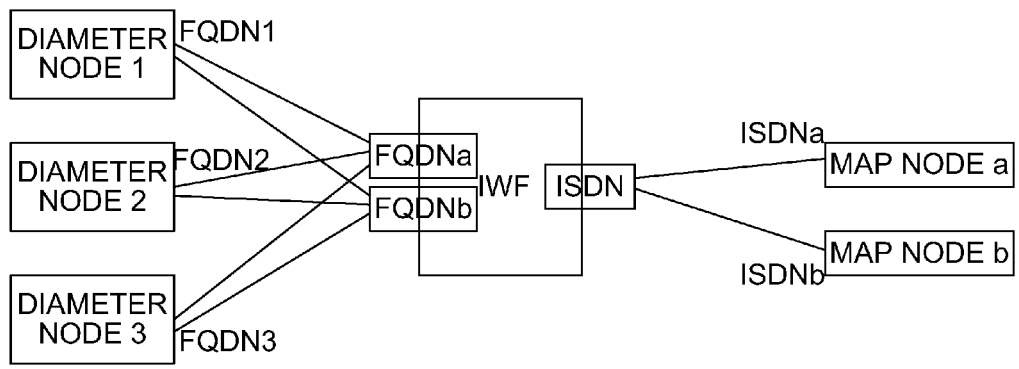
FIG. 11 illustrates a system block diagram according to a seventh embodiment of the present invention.

According to the seventh embodiment of the present invention, an IWF network element may serve one or more Diameter nodes and MAP nodes. Based on the assignment and plan for the number resource ISDN, the IWF may still serve a plurality of Diameter nodes while use only one ISDN, as illustrated in FIG. 11. The IWF may have one ISDN number resource that is served as a local identification when the Diameter node is accessing the MAP node and the IWF is communicating at the MAP side. The local identification may use the domain name constructed based on the ISDN number of the MAP node, e.g., in the form of *.wellknownstring.ISDN.*, when the IWF is communicating at the Diameter side.

The eighth, ninth, tenth and eleventh embodiments of the present invention are made on the basis of the seventh embodiment of the present invention to illustrate the communication situations respectively.

Figure 12:
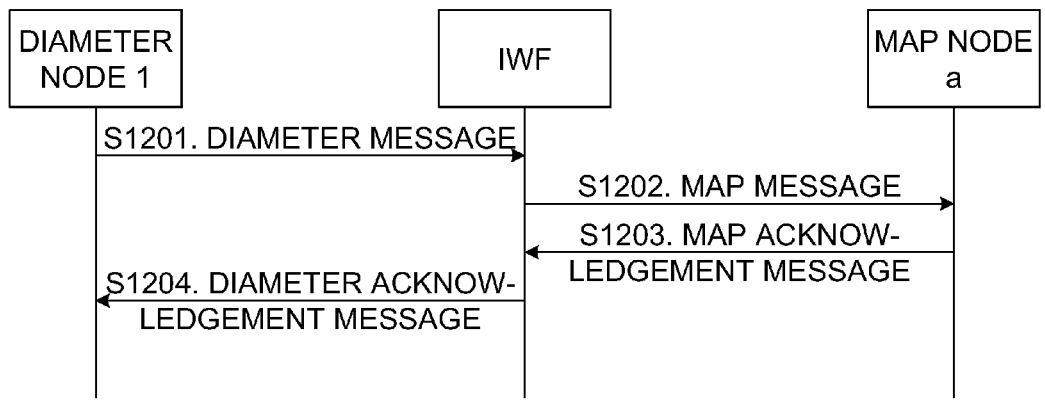
FIG. 12 illustrates a schematic flowchart of communications according to an eighth embodiment of the present invention.

According to the eighth embodiment of the present invention, the Diameter node is a client. Thus, in terms of a service for a user, the client Diameter node may actively contact the server MAP node first. When Diameter node 1 initiates a communication with MAP node a, specific procedures are illustrated in FIG. 12, including below steps.

Step s1201: Diameter node 1 sends a Diameter message to the addressing information to which FQDNa corresponds, where the source node domain name in the message (i.e., Origin-Host AVP: DiameterIdentity) is FQDN1. A destination node domain name (i.e., Destination-Host AVP) that may also be included in the message is FQDNa, if required.

Step s1202: The IWF matches to MAP node a according to the destination node domain name or the peer addressing information (the destination address) in the received Diameter message, obtains ISDNa to which MAP node a corresponds, finds the corresponding addressing information based on ISDNa, and then forwards the message to MAP node a. The message can be sent to MAP node a with the address to which the ISDN number corresponds and which is shared in the IWF as the source address, where the MAP message may carry the ISDN if the source node identification needs to be included in the message. The IWF may record a relationship between the user identification and Diameter node 1 that may be utilized for a request message in terms of the user initiated then by the MAP node.

Step s1203: MAP node a replies with an acknowledgement message to the IWF, and carries the ISDN number of the node, i.e., ISDNa, if required. Moreover, MAP node a may record a peer identification in the message, i.e., ISDN, which may be utilized for addressing when MAP node a actively contacts this peer later.

Step s1204: The IWF directs to the original request message (the message in step s1201/s1202) by matching the user identification of the message and/or a sequence number of the message, and determines the destination Diameter node 1 of the acknowledgement message. The IWF then maps the MAP acknowledgement message into a Diameter message and replies with it to Diameter node 1, where FQDNa is included in the message as a source node domain name, and the message is sent with the address to which FQDNa corresponds as the source address.

Figure 13:
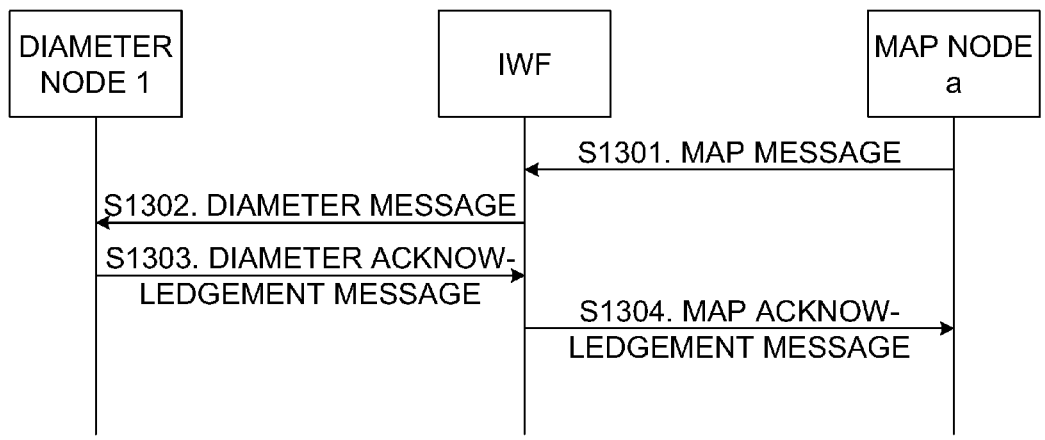
FIG. 13 illustrates a schematic flowchart of communications according to a ninth embodiment of the present invention.

According to the ninth embodiment of the present invention, the Diameter node is a client. Thus, in terms of a service for a user, the client Diameter node may actively contact the server MAP node first. When MAP node a initiates a communication with Diameter node 1, specific procedures are illustrated in FIG. 13, including below steps.

Step s1301: MAP node a sends an MAP message to the addressing information to which ISDN corresponds, where the message may carry the node number, i.e., ISDNa, if required.

Step s1302: The IWF finds the previously saved Diameter node 1 to which the user corresponds according to the user identification in the received MAP message, obtains the identification FQDN1 of the Diameter node, then finds the corresponding addressing information according to FQDN1, and forwards the message to Diameter node 1. The message can be sent with the address to which FQDNa corresponds as the source addressing information, where FQDNa is matched to the corresponding ISDNa via the source addressing information of the message, and then FQDNa is derived from the construct based on ISDNa. Moreover, FQDNa is populated in the source node domain name included in the Diameter message.

Step s1303: Diameter node 1 sends an acknowledgment message to the IWF.

Step s1304: The IWF node maps the Diameter acknowledgment message into the MAP message, and replies with it to MAP node a, where the message is sent via a signaling point to which ISDN corresponds.

Figure 14:
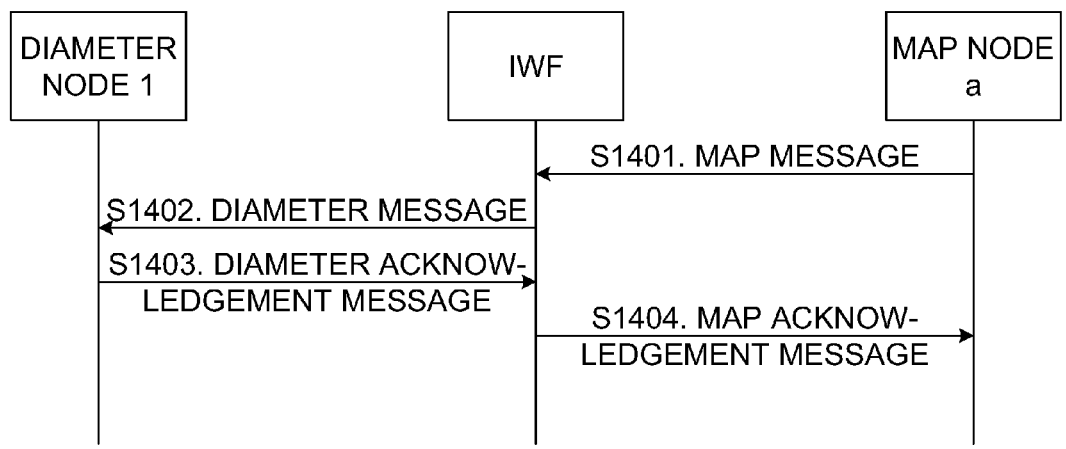
FIG. 14 illustrates a schematic flowchart of communications according to a tenth embodiment of the present invention.

According to the tenth embodiment of the present invention, the Diameter node is a server while the MAP node is a client. The client may initiate a communication interaction when accessed by a user, and then, the server may actively initiate a communication with the client when necessary. When MAP node a initiates a communication with Diameter node 1, specific procedures are illustrated in FIG. 14, including below steps.

Step s1401: MAP node a sends an MAP message to the addressing information to which ISDN corresponds, where the message may carry the node number, i.e., ISDNa, if required.

Step s1402: The IWF assigns a Diameter server to the user according to the user identification in the received MAP message. The IWF may record a relationship between the user identification and the Diameter node for addressing when the MAP node actively sends the user message next time. Assume that the IWF assigns Diameter node 1 to the user, then the Diameter node identification FQDN1 is obtained. Next, the IWF finds the corresponding addressing information based on FQDN1, and forwards the message to Diameter node 1. The message can be sent with the address to which FQDNa corresponds as the source address, where FQDNa is matched to the corresponding ISDNa via the source signaling point of the message, and then FQDNa is derived from the construct based on ISDNa. Moreover, FQDNa is populated in the source node domain name included in the Diameter message.

Step s1403: Diameter node 1 sends an acknowledgment message to the IWF.

Step s1404: The IWF node maps the Diameter acknowledgment message into the MAP message, and replies with it to MAP node a, where the message is sent with the address to which ISDN corresponds as the source address.

Figure 15:
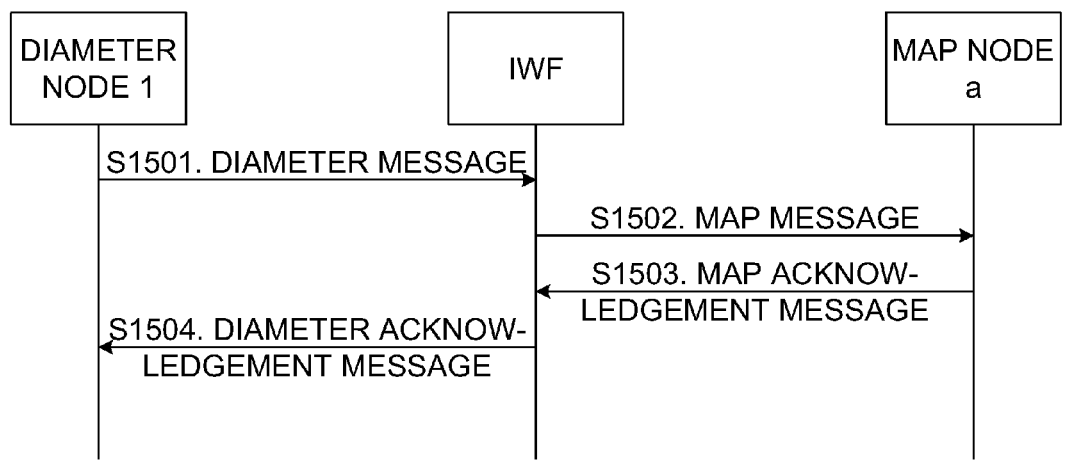
FIG. 15 illustrates a schematic flowchart of communications according to a eleventh embodiment of the present invention.

According to the eleventh embodiment of the present invention, the Diameter node is a server while the MAP node is a client. When Diameter node 1 initiates a communication with MAP node a, specific procedures are illustrated in FIG. 15, including below steps.

Step s1501: Diameter node 1 sends a Diameter message to the addressing information to which FQDNa corresponds, where the source node domain name in the message (i.e., Origin-Host AVP: DiameterIdentity) is FQDN1. A destination node domain name (i.e., Destination-Host AVP) that may also be included in the message is FQDNa, if required.

Step s1502: The IWF matches to ISDNa or MAP node a according to the destination node domain name or the peer information (the destination address) in the received Diameter message, finds the corresponding addressing information based on ISDNa, and then forwards the message to MAP node a. The message can be sent to MAP node a with the ISDN number shared in the IWF, where the MAP message may carry the ISDN if the source node identification needs to be included in the message.

Step s1503: MAP node a replies with an acknowledgement message to the IWF, and carries the ISDN number of the node, i.e., ISDNa, if required. If required, MAP node a may record a peer identification in the message, i.e., ISDN, which may be utilized for addressing when MAP node a actively contacts this peer later.

Step s1504: The IWF maps the MAP acknowledgement message into a Diameter message and replies with it to Diameter node 1, where FQDNa is included in the message as a source node domain name, and the message can be sent from the address to which FQDNa corresponds.

Figure 16:
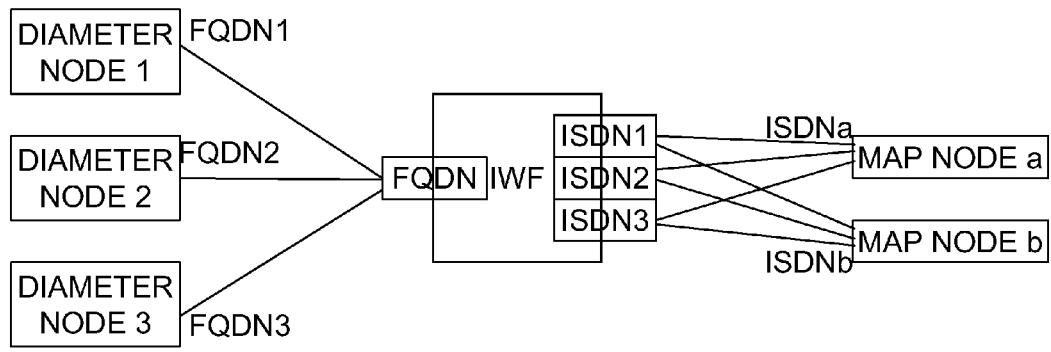
FIG. 16 illustrates a system block diagram according to a twelfth embodiment of the present invention.

According to the twelfth embodiment of the present invention, an IWF network element may serve one or more Diameter nodes and MAP nodes, where the IWF has a shared domain name for communicating with the Diameter node, as illustrated in FIG. 16. In terms of an access message from a user, the IWF may also function to assign a server according to the user identification.

The thirteenth, fourteenth, fifteenth and sixteenth embodiments of the present invention are made on the basis of the twelfth embodiment of the present invention to illustrate the communication situations.

Figure 17:
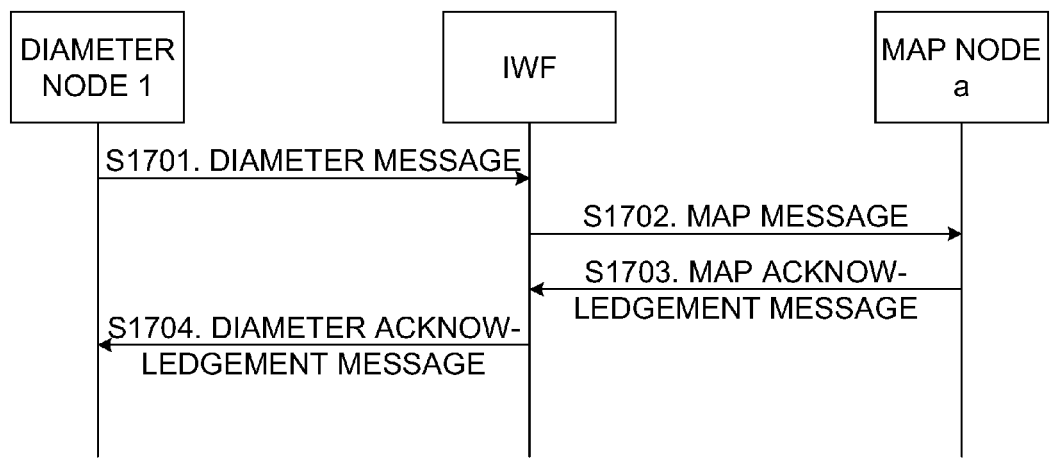
FIG. 17 illustrates a schematic flowchart of communications according to a thirteenth embodiment of the present invention.

According to the thirteenth embodiment of the present invention, in terms of a service for a user, usually, the Diameter node may actively contact the MAP node first, i.e., Diameter node 1 initiates a communication with MAP node a, specific procedures of which are illustrated in FIG. 17, including below steps.

Step s1701: Diameter node 1 sends a Diameter message to the addressing information to which FQDN corresponds, where the source node domain name in the message (i.e., Origin-Host AVP: DiameterIdentity) is FQDN1. A destination node domain name (i.e., Destination-Host AVP) that may also be included in the message is FQDN, if required.

Step s1702: The IWF matches a corresponding server based on the user information (e.g., based on the user identification, etc.) in the received Diameter message. If no server is matched, then an appropriate server is assigned, and a relationship between the server node and the user is recorded. Assume it is MAP node a, then the IWF obtains ISDNa to which MAP node a corresponds, finds the corresponding addressing information, and forwards the message to MAP node a. The message is sent with the address to which ISDN1 corresponds as the source address, and ISDN1 is mapped based on the source node identification FQDN1 in the message. If the source node identification needs to be included in the message, ISDN1 is then included in the MAP message.

Step s1703: MAP node a replies with an acknowledgement message to the IWF, and carries the ISDN number of the node, i.e., ISDNa, if required. If required, MAP node a may record a peer identification in the message, i.e., ISDN1, which may be utilized for addressing when MAP node a actively contacts this peer later.

Step s1704: The IWF maps the MAP acknowledgement message into a Diameter message and replies with it to Diameter node 1, where FQDN is included in the message as a source node domain name, and the message can be sent via the address to which FQDN corresponds.

Figure 18:
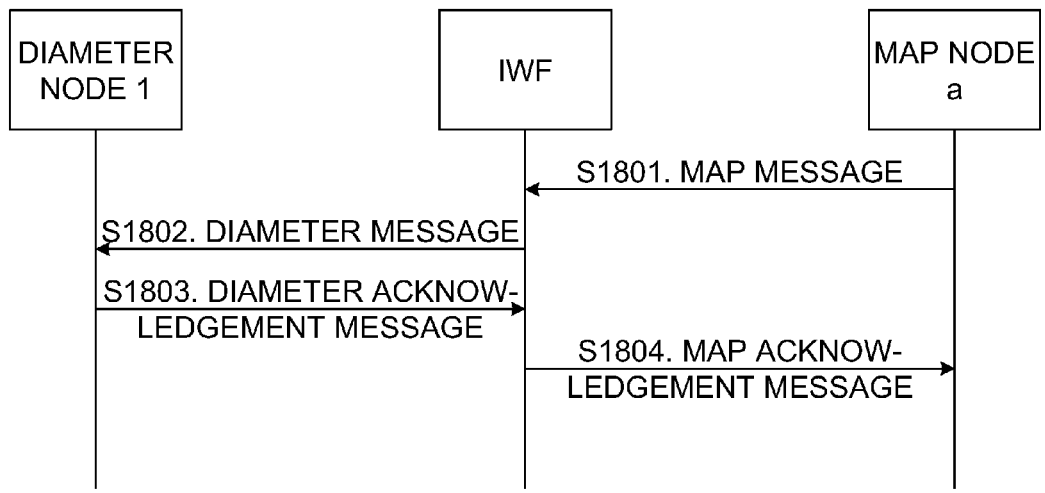
FIG. 18 illustrates a schematic flowchart of communications according to a fourteenth embodiment of the present invention.

According to the fourteenth embodiment of the present invention, MAP node a initiates a communication with Diameter node 1, specific procedures of which are illustrated in FIG. 18, including below steps.

Step s1801: MAP node a sends an MAP message to the addressing information to which ISDN1 corresponds, where the message may carry the node number, i.e., ISDNa, if required.

Step s1802: The IWF matches to ISDN1 and Diameter node 1 according to the peer addressing information (signaling point code/GT code/IP address) in the received MAP message, obtains FQDN1 to which Diameter node 1 corresponds, finds the corresponding addressing information, and then forwards the message to Diameter node 1. The message can be sent with the address to which FQDN corresponds as the source address, and FQDN is populated in the source node domain name included in the Diameter message.

Step s1803: Diameter node 1 sends an acknowledgment message to the IWF.

Step s1804: The IWF node maps the Diameter acknowledgment message into the MAP message, and replies with it to MAP node a, where the message is sent with the address to which ISDN1 corresponds as the source address.

According to the twelfth to fourteenth embodiments of the present invention, since the interaction message of the Diameter/MAP node is served for a certain user where the message may have the user identification, the IWF may thereby utilize such user identification to distinguish the MAP node under the shared domain name.

The twelfth to fourteenth embodiments of the present invention apply to the scenario that a user may only use one Diameter node at the same time. In the mobile network, however, sometimes a user may access two Diameter nodes simultaneously, i.e., at the time of switching. Therefore, the fifteenth embodiment of the present invention provides a solution in such scenario that may be regarded as an extended application based on the twelfth embodiment.

Figure 19:
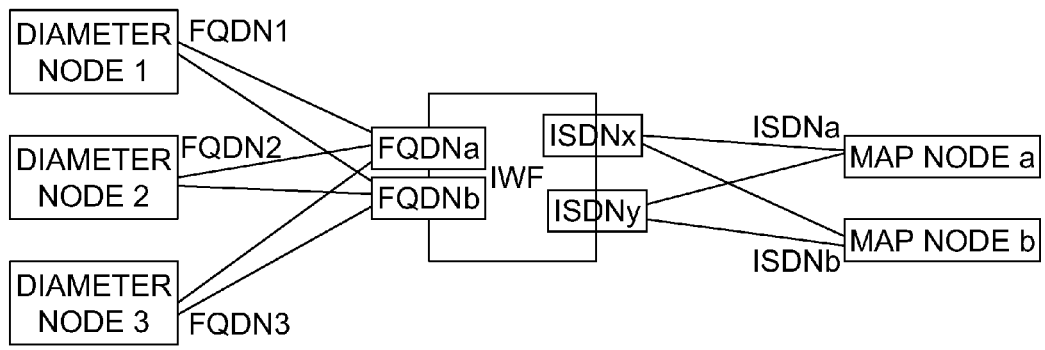
FIG. 19 illustrates a system block diagram according to a fifteenth embodiment of the present invention.

According to the fifteenth embodiment of the present invention, an IWF network element may serve one or more Diameter nodes and MAP nodes, as shown in FIG. 19. Therein, the Diameter node is a client while the MAP node is a server. Since a user may simultaneously use two Diameter clients during some periods, the IWF may therefore provide two shared ISDN numbers. When a user accesses the MAP server using the first Diameter client, the IWF may assign an ISDN number accordingly. When the user accesses the same MAP server using the second Diameter client served by the IWF, the IWF may assign another ISDN number accordingly. The IWF records a relationship between the user identification and the shared ISDN numbers and the Diameter node, for the message addressing when the MAP node sends the message to the Diameter node.

Figure 20:
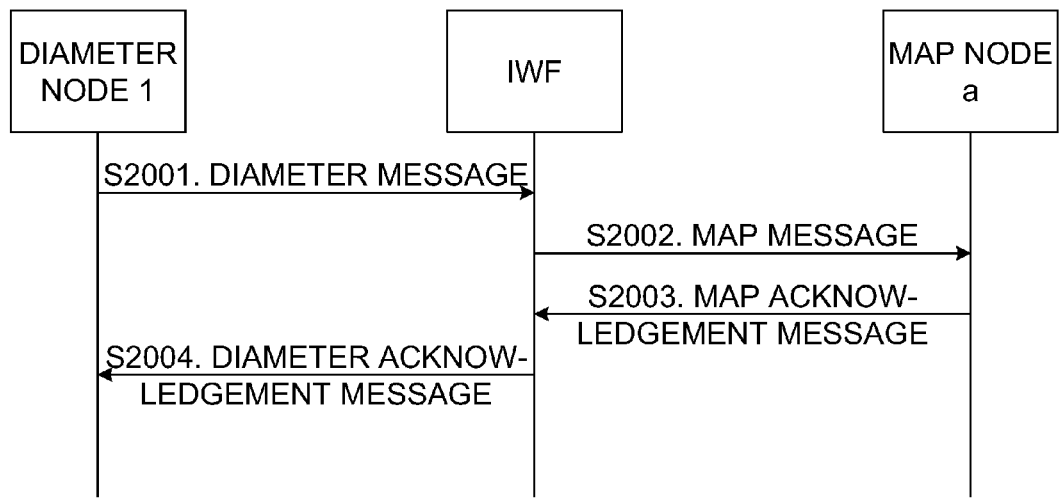
FIG. 20 illustrates a schematic flowchart of communications according to a sixteenth embodiment of the present invention.

According to the sixteenth embodiment of the present invention, Diameter node 1 initiates a communication with MAP node a, specific procedures of which are illustrated in FIG. 20, including below steps.

Step s2001: Diameter node 1 sends a Diameter message to the addressing information to which FQDNa corresponds, where the source node domain name in the message (i.e., Origin-Host AVP: DiameterIdentity) is FQDN1. A destination node domain name (i.e., Destination-Host AVP) that may also be included in the message is FQDNa, if required.

Step s2002: The IWF matches to FQDNa and MAP node a according to the destination node domain name or the peer addressing information (the destination address) in the received Diameter message, obtains the corresponding ISDNa, finds the corresponding addressing information based on ISDNa, and then forwards the message to MAP node a.

Thus, the IWF may assign the ISDN number for the access to Diameter node 1 by the user, assuming ISDNx, so that the message may be sent to MAP node a with the addressing information to which the ISDNx number corresponds and which is shared in the IWF, where the MAP message may carry the ISDNx if the source node identification needs to be included in the message.

The IWF needs to obtain the user identification from the Diameter message, and record the user identification and the relationship between the ISDNx and Diameter node 1.

Step s2003: MAP node a replies with an acknowledgement message, and carries the ISDN number of the node, i.e., ISDNa, if required. If required, MAP node a may record a peer identification, i.e., ISDNx, which may be utilized for addressing when MAP node a actively contacts this peer later.

Step s2004: The IWF maps the MAP acknowledgement message into a Diameter message and replies with it to Diameter node 1, where FQDNa is included in the message as a source node domain name, and the message can be sent with the address to which FQDNa corresponds as the source address.

Figure 21:
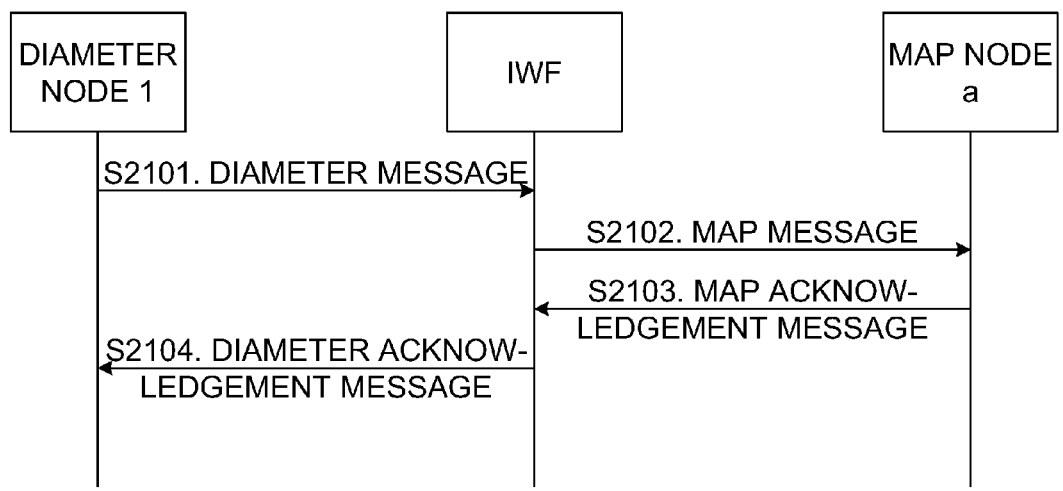
FIG. 21 illustrates a schematic flowchart of communications according to a seventeenth embodiment of the present invention.

According to the seventeenth embodiment of the present invention, Diameter node 2 initiates a communication with MAP node a, specific procedures of which are illustrated in FIG. 21, including below steps.

Step s2101: Diameter node 2 sends a Diameter message to the addressing information to which FQDNa corresponds, where the source node domain name in the message (i.e., Origin-Host AVP: DiameterIdentity) is FQDN1. A destination node domain name (i.e., Destination-Host AVP) that may also be included in the message is FQDNa, if required.

Step s2102: The IWF matches to FQDNa and MAP node a according to the destination node domain name or the peer information (the destination address) in the received Diameter message, obtains the corresponding ISDNa, finds the corresponding addressing information based on ISDNa, and then forwards the message to MAP node a.

The IWF determines that the user accesses Diameter node 1 and now accesses Diameter node 2 also. Thus, the IWF may assign another ISDN number, assuming ISDNy, so that the message may be sent to MAP node a with the addressing information to which the ISDNy number corresponds and which is shared in the IWF, where the MAP message may carry the ISDNy if the source node identification needs to be included in the message.

The IWF needs to obtain the user identification from the Diameter message, and record the relationship between the user identification and the Diameter node currently used by the user.

Step s2103: MAP node a replies with an acknowledgement message, and carries the ISDN number of the node, i.e., ISDNa, if required. If required, MAP node a may record a peer identification in the message, i.e., ISDNy, which may be utilized for addressing when MAP node a actively contacts this peer later.

Step s2104: The IWF maps the MAP acknowledgement message into a Diameter message and replies with it to Diameter node 2, where FQDNa is included in the message as a source node domain name, and the message can be sent with the address to which FQDNa corresponds as the source address.

It should be noted that the two procedures in the foregoing sixteenth and seventeenth embodiments refer to the scenario that the same user simultaneously accesses two Diameter nodes, and the assigned ISDNx/y number may also be assigned to other users accessing the same or different Diameter node. In other words, the assignment of the ISDN numbers only needs to ensure that the same user uses different ISDN number of different Diameter node at the same time.

Figure 22:
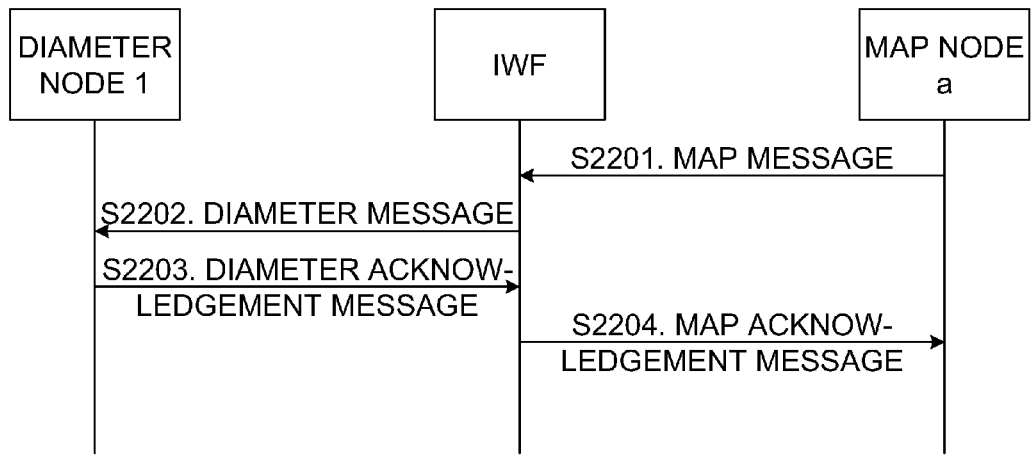
FIG. 22 illustrates a schematic flowchart of communications according to an eighteenth embodiment of the present invention.

According to the eighteenth embodiment of the present invention, MAP node a initiates a communication with Diameter node 1, specific procedures of which are illustrated in FIG. 22, including below steps.

Step s2201: MAP node a sends an MAP message to the addressing information to which ISDNx corresponds, where the message may carry the node number, i.e., ISDNa, if required.

Step s2202: The IWF searches for a previous record according to the user identification in the received MAP message, finds the corresponding Diameter node 1 according to the user identification and ISDNx, obtains the identification FQDN1 of the Diameter node, then finds the corresponding addressing information according to FQDN1, and forwards the message to Diameter node 1. The message can be sent with the address to which FQDNa corresponds as the source address, where FQDNa is matched to the corresponding ISDNa via the source addressing information of the message, and then FQDNa is derived from the construct based on ISDNa. Moreover, FQDNa is populated in the source node domain name included in the Diameter message.

Step s2203: Diameter node 1 sends an acknowledgment message to the IWF.

Step s2204: The IWF node maps the Diameter acknowledgment message into the MAP message, and replies with it to MAP node a, where the message is sent with the addressing information to which ISDN corresponds as the source address.

It should be noted that the foregoing procedure may also be applicable to the communication between the MAP node and Diameter node 2, where the difference lies in that the MAP node may send the message to ISDNy number and Diameter node 2 may be addressed by the IWF accordingly. As can be deduced by analogy, if the user needs to simultaneously access more Diameter nodes, i.e., more than two, this method may apply as well. That is, the IWF may assign different ISDN numbers to the same user simultaneously accessing different Diameter nodes.

Figure 23:
FIG. 23 illustrates a block diagram of a system for heterogeneous addressing mapping according to an embodiment of the present invention.

As illustrated in FIG. 23, a system for heterogeneous addressing mapping is provided according the embodiments of the present invention. The system includes:

a Diameter protocol node 231, an MAP protocol node 232 and an IWF 233.

The IWF 233 is configured to assign a first identification or a first address to the Diameter protocol node 231, map a received Diameter protocol message of the Diameter protocol node 231 into an MAP protocol message, and send the mapped MAP protocol message to the MAP protocol node 232 using the first address assigned by the IWF 233 as a source address or using the first identification assigned by the IWF 233 as a source identification.

Figure 24:
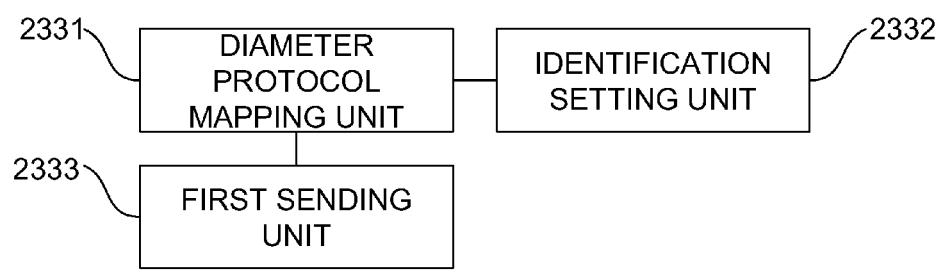
FIG. 24 illustrates a block diagram of an IWF according to an embodiment of the present invention.

As illustrated in FIG. 24, the IWF 233 may include:

a Diameter protocol mapping unit 2331, configured to map the received Diameter protocol message of the Diameter protocol node 231 into the MAP protocol message;

an identification setting unit 2332, configured to use the first address assigned by the IWF 233 as a source address or the first identification as a source identification; and a first sending unit 2333, configured to send the mapped MAP protocol message to the MAP protocol node 232.

Figure 25:
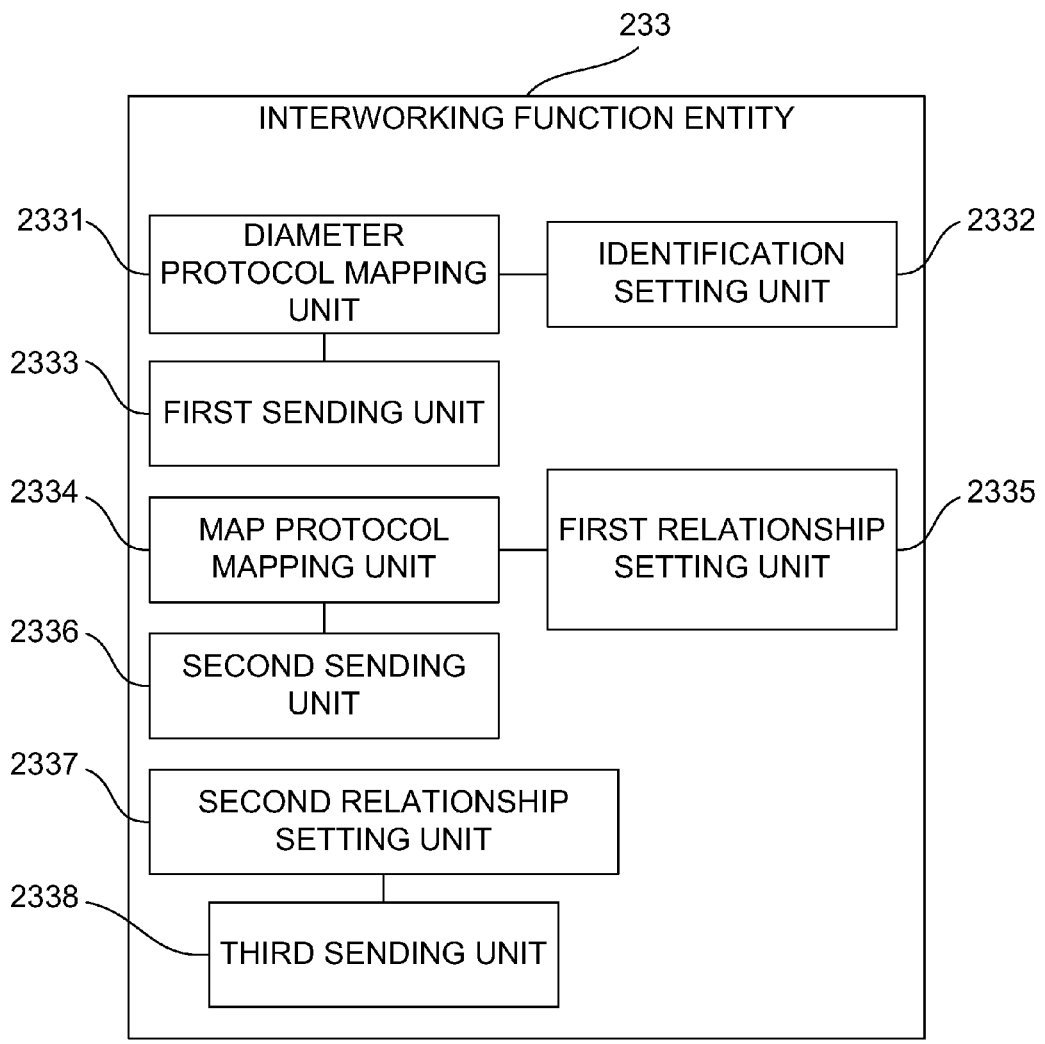
FIG. 25 illustrates a block diagram of another IWF according to an embodiment of the present invention.

As illustrated in FIG. 25, when the first address or the first identification assigned by the IWF 233 corresponds to a unique Diameter protocol node 231, the above IWF 233 may also include:

an MAP protocol mapping unit 2334, configured to map the received MAP protocol message into the Diameter protocol message;

a first relationship setting unit 2335, configured to configure the relationship between the first address or the first identification and the Diameter protocol node 231; or, assign a first address or a first identification of the IWF 233 to the Diameter protocol node 231, and assign the relationship between the first address or the first identification and the Diameter protocol node 231, when the message mapping is required for the Diameter protocol node 231;

a second sending unit 2336, configured to send the Diameter protocol message to the Diameter protocol node 231 to which the first address or the first identification assigned by the IWF 233 corresponds, where the first address or first identification information assigned by the IWF 233 is included in the foregoing received MAP protocol message as destination information.

In the scenario that the identification and the node are not one-to-one correspondent so that there needs a user ID or other ID for distinguishing, the foregoing IWF 233 may also include:

a second relationship setting unit 2337, configured to record a relationship between key identification information of the Diameter protocol message or/and the mapped MAP protocol message and the Diameter protocol node 231; and a third sending unit 2338, configured to map the received MAP protocol message including the key identification information into the Diameter protocol message, and send it to the Diameter protocol node 231 to which the key identification information corresponds.

The foregoing key identification information includes the user identification or session protocol identification.

According to the embodiments of the present invention, the IWF 233 may also be configured to assign a second identification or a second address to the MAP protocol node 232; and map the received MAP message of the MAP protocol node 232 into the Diameter protocol message, and send the mapped Diameter protocol message to the Diameter protocol node 231 using the second address assigned by the IWF 233 as a source address or using the second identification assigned by the IWF 233 as a source identification.

Figure 26:
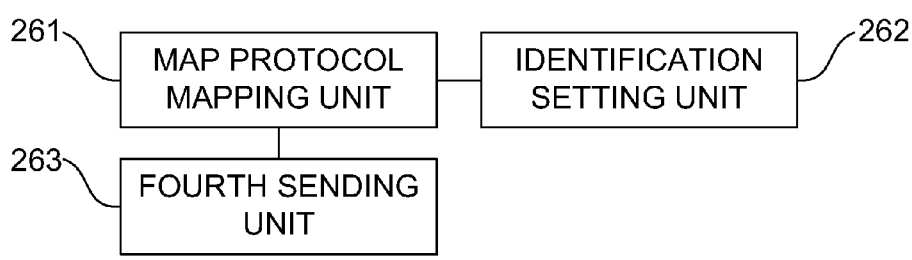
FIG. 26 illustrates a block diagram of yet another IWF according to an embodiment of the present invention.

As illustrated in FIG. 26, the IWF 233 may include:

an MAP protocol mapping unit 261, configured to map the received MAP protocol message of the MAP protocol node 232 into the Diameter protocol message;

an identification setting unit 262, configured to use the second address assigned by the IWF 233 as a source address or the second identification as a source identification; and a fourth sending unit 263, configured to send the mapped Diameter protocol message to the Diameter protocol node 231.

Figure 27:
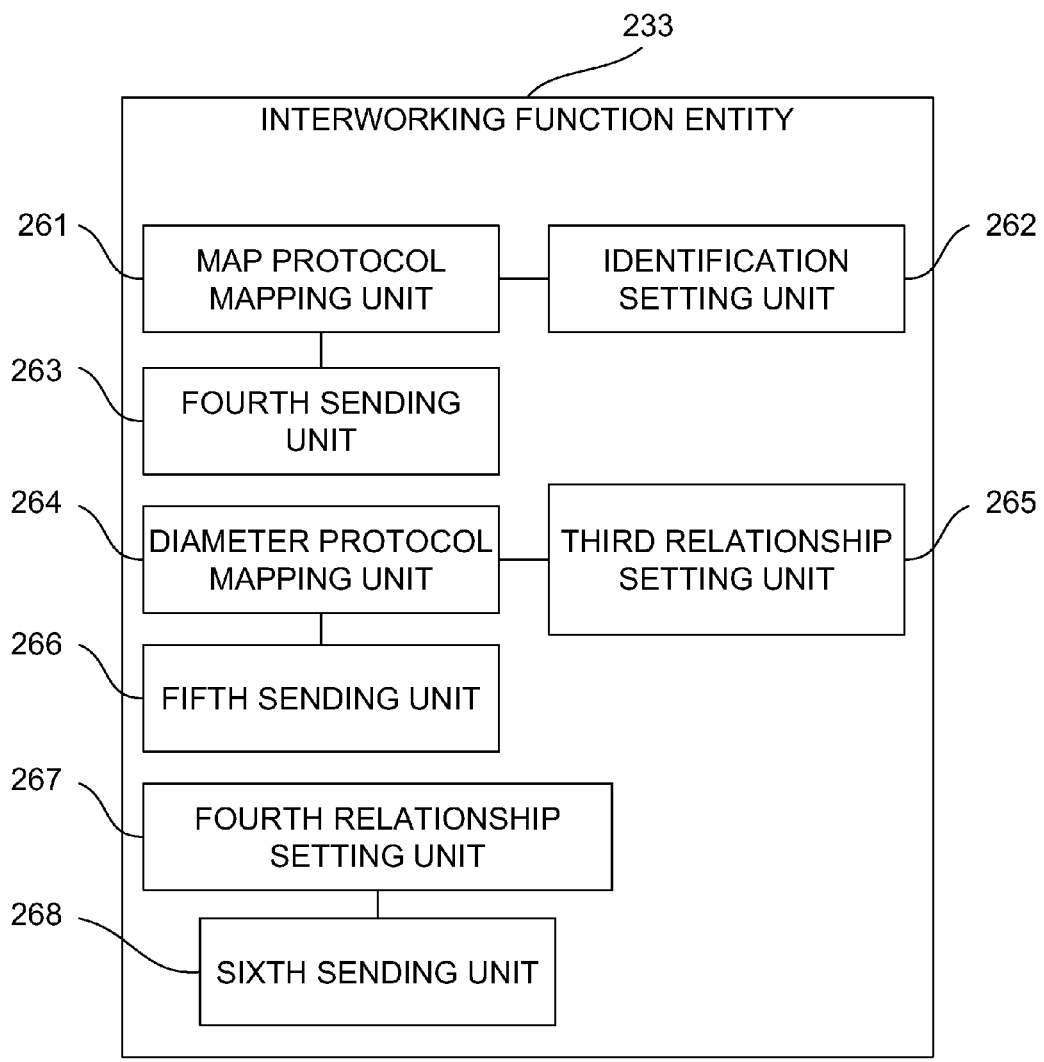
FIG. 27 illustrates a block diagram of yet another IWF according to an embodiment of the present invention.

As illustrated in FIG. 27, when the second address or the second identification assigned by the IWF 233 corresponds to a unique MAP protocol node 232, the IWF 233 may also include:

a Diameter protocol mapping unit 264, configured to map the received Diameter protocol message into the MAP protocol message;

a third relationship setting unit 265, configured to configure the relationship between the second address or the second identification and the MAP protocol node 232; or, assign a second address or a second identification of the IWF 232 to the MAP protocol node 232, and assign the relationship between the second address or the second identification and the MAP protocol node 232, when the message mapping is required for the MAP protocol node 232; and a fifth sending unit 266, configured to send the MAP protocol message to the MAP protocol node 232 to which the second address or the second identification assigned by the IWF 232 corresponds, where the second address or second identification information assigned by the IWF 233 is included in the foregoing received MAP protocol message as destination information.

In the scenario that the identification and the node are not one-to-one correspondent so that there needs a user ID or other ID for distinguishing, the IWF 233 may also include:

a fourth relationship setting unit 267, configured to record a relationship between key identification information of the MAP protocol message or/and the mapped Diameter protocol message and the MAP protocol node 232; and a sixth sending unit 268, configured to map the received Diameter protocol message including the key identification information into the MAP protocol message, and send it to the MAP protocol node 232 to which the key identification information corresponds.

The key identification information therein includes the user identification or session protocol identification.

According to the embodiments of the present invention, when the Diameter node is communicating with the MAP node via the Interworking Function entity, the method for mapping the node identification for each other as well as the addressing relationship corresponding to each identification are provided. Thus, the problems that the communication with each other cannot be realized due to different identification addressing approaches are solved. In addition, the method for the communications between a plurality of Diameter nodes and MAP nodes via shared ISDN numbers in the IWF, so that the IWF may easily serve a plurality of Diameter nodes rather than apply for an ISDN number for each served Diameter node.

With the description of the foregoing embodiments, it is readily appreciated by those skilled in the art that the present invention may be implemented with hardware, and may also be implemented with software on a necessary hardware platform. Based on this understanding, solutions provided by the present invention may be embodied in a software product.

The software product may be stored in a nonvolatile storage media (may be a CD-ROM, a USB flash disc, a mobile hard disc, etc.) The software product may include a set of instructions enabling a computer device (may be a personal computer, a server, or a network device, etc.) to perform methods according to various embodiment of the present invention.

In summary, the foregoing is merely preferred embodiments of the present invention and is not intended to be limiting to the scope of the present invention. Any modifications, equivalents, improvements made within the spirit and principle of the present invention shall be construed as fall within the scope of the present invention.

What is claimed is:

1. A method for heterogeneous addressing mapping, comprising:

assigning, by an Interworking Function entity (IWF), for a Diameter protocol node that utilizes a domain name approach for addressing one of the group consisting of:
a first identification, and
a first address;

mapping a received Diameter protocol message sent from the Diameter protocol node into a Mobile Application Part (MAP) protocol message; and sending the MAP protocol message to an MAP protocol node that utilizes an Integrated Service Digital Network (ISDN) by implementing one of the group consisting of:
(a) using the first address assigned by the IWF as a source address; and
(b) using the first identification assigned by the IWF as a source identification.

2. The method of claim 1, wherein, the one of the group consisting of the first identification and the first address corresponds to the Diameter protocol node.

3. The method of claim 2, wherein, the IWF assigning the one of the group consisting of the first identification and the first address for a Diameter protocol node comprises:

assigning, by the IWF, the one of the group consisting of the first address and the first identification to the Diameter protocol node when a message mapping for the Diameter protocol node is required, and assigning a relationship between the one of the group consisting of the first address and the first identification, and the Diameter protocol node.

4. The method of claim 2, further comprising, mapping, by the IWF, a received MAP protocol message into a Diameter protocol message;

sending the Diameter protocol message to the Diameter protocol node, wherein the one of the group consisting of the first address and the first identification corresponds to the Diameter protocol node, and wherein the received MAP protocol message includes the first address or the first identification information as destination information.

5. The method of claim 2, wherein, assigning one of the group consisting of a first identification or a first address for a Diameter protocol node comprises one of the group consisting of:

(a) configuring, by the IWF, a corresponding relationship between the first address and the Diameter protocol node; and (b) configuring, by the IWF, a corresponding relationship between the first identification and the Diameter protocol node.

6. The method of claim 1, further comprising,
recording, by the IWF, a relationship between:
key identification information of one of the group consisting of: the received Diameter protocol message, and the MAP protocol message; and
the Diameter protocol node;
mapping, by the IWF, a received MAP protocol message including the key identification information into a Diameter protocol message, and then sending the mapped Diameter protocol message to the corresponding Diameter protocol node;
wherein, the key identification information is one of the group consisting of:
a user identification associated with the one of the group consisting of: the received Diameter protocol message and the MAP protocol message; and
a protocol session identification associated with the one of the group consisting of: the received Diameter protocol message and the MAP protocol message.

7. A method for heterogeneous addressing mapping, comprising:
assigning, by an Interworking Function entity (IWF), to a Mobile Application Part (MAP) protocol node that utilizes an Integrated Service Digital Network (ISDN) number for addressing one of the group consisting of:
a first identification; and
a first address;
mapping, a received MAP protocol message sent from the MAP protocol node into a Diameter protocol message; and
sending the Diameter protocol message to a Diameter protocol node that utilizes a domain name approach for addressing, by implementing one of the group consisting of:
(a) using the first address assigned by the IWF as a source address; and
(b) using the first identification assigned by the IWF as a source identification.

8. The method of claim 7, wherein,
the one of the group consisting of the first identification and the first address assigned by the IWF corresponds to the MAP protocol node.

9. The method of claim 8, wherein,
the IWF assigning the one of the group consisting of the first identification and the first address for an MAP protocol node comprises one of the group consisting of:
the IWF configuring a corresponding relationship between the first address the MAP protocol node; and
the IWF configuring a corresponding relationship between the first identification and the MAP protocol node.

10. The method of claim 8, wherein,
the IWF assigning the one of the group consisting of a second identification and a second address for an MAP protocol node comprises:
assigning, by the IWF, the one of the group consisting of the second address and the second identification to the MAP protocol node when a message mapping is required, and assigning a relationship between the second address or the second identification and the MAP protocol node.

11. The method of claim 8, further comprising,
mapping, by the IWF, a received Diameter protocol message into an MAP protocol message;
sending the MAP protocol message to the MAP protocol node, wherein the one of the group consisting of the first address and the first identification corresponds to the MAP protocol node, and wherein the received Diameter protocol message includes the one of the group consisting of the first address and the first identification information as destination information.

12. The method of claim 7, further comprising,
recording, by the IWF, a relationship between key identification information of the at least one of the group consisting of the received MAP protocol message and the Diameter protocol message and the MAP protocol node;
mapping, by the IWF, a received Diameter protocol message including the key identification information into an MAP protocol message, and then sending the mapped MAP protocol message to the corresponding MAP protocol node;
wherein, the key identification information is one of the group consisting of:
(a) a user identification associated with the at least one of the group consisting of the MAP protocol message and the Diameter protocol message; and
(b) a protocol session identification associated with the at least one of the group consisting of the MAP protocol message and the Diameter protocol message.

13. A system for heterogeneous addressing mapping, comprising:
a Diameter protocol node that utilizes a domain name approach for addressing, an MAP protocol node that utilizes an Integrated Service Digital Network (ISDN) number for addressing, and an Interworking Function entity (IWF),
wherein the IWF is configured to:
assign one of the group consisting of a first identification and a first address to the Diameter protocol node,
map a received Diameter protocol message sent from the Diameter protocol node into an MAP protocol message, and
send the MAP protocol message to the MAP protocol node by implementing one of the group consisting of:
(a) the first address assigned by the IWF as a source address; and
(b) using the first identification assigned by the IWF as a source identification.

14. An Interworking Function entity (IWF), comprising:
a Diameter protocol mapping unit, configured to map a received Diameter protocol message from a Diameter protocol node that utilizes a domain name approach for addressing into an MAP protocol message by implementing one of the group consisting of:
(a) using a first address as a source address, and
(b) using a first identification as a source identification; and
a first sending unit, configured to send the MAP protocol message to an MAP protocol node that utilizes an Integrated Service Digital Network (ISDN) number for addressing.

15. The IWF of claim 14, when the first address or the first identification corresponds to the Diameter protocol node, the IWF further comprises:
an MAP protocol mapping unit, configured to map a received MAP protocol message into a Diameter protocol message;
a first relationship setting unit, configured to configure the relationship between the one of the group consisting of the first address and the first identification, and the Diameter protocol node; and
a second sending unit, configured to send the Diameter protocol message to the Diameter protocol node, wherein the one of the group consisting of the first address and the first identification corresponds to the Diameter protocol node, wherein the one of the group consisting of the first address and the first identification information is included in the received MAP protocol message as destination information.

16. The IWF of claim 14, when the one of the group consisting of the first address and the first identification corresponds to the Diameter protocol node, the IWF further comprises:
- an MAP protocol mapping unit, configured to map a received MAP protocol message into a Diameter protocol message;
- a first relationship setting unit, configured to assign the one of the group consisting of the first address and the first identification to the Diameter protocol node when the message mapping is required, and assign the relationship between the one of the group consisting of the first address and the first identification, and the Diameter protocol node; and
- a second sending unit, configured to send the Diameter protocol message to the Diameter protocol node to which the one of the group consisting of the first address and the first identification corresponds, wherein the one of the group consisting of the first address and the first identification information is included in the received MAP protocol message as destination information.

17. A system for heterogeneous addressing mapping, comprising:
- a Mobile Application Part (MAP) protocol node that utilizes an ISDN number for addressing, a Diameter protocol node that utilizes a domain name approach for addressing and an Interworking Function entity (IWF),
- wherein the IWF is configured to assign a first identification or a first address to the MAP protocol node, map a received MAP protocol message sent from the MAP protocol node into a Diameter protocol message, and send the Diameter protocol message to the Diameter protocol node by implementing one of the group consisting of (a) using the first address assigned by the IWF as a source address and (b) using the first identification assigned by the IWF as a source identification.

18. An Interworking Function entity (IWF), comprising:
- an MAP protocol mapping unit, configured to map a received MAP protocol message of an MAP protocol node that utilizes an Integrated Service Digital Network (ISDN) number for addressing into a Diameter protocol message by implementing one of the group consisting of (a) using a first address as a source address and (b) a first identification as a source identification; and
- a first sending unit, configured to send the Diameter protocol message to a Diameter protocol node that utilizes a domain name approach for addressing.

19. The IWF of claim 18, when the one of the group consisting of the first address and the first identification corresponds to the MAP protocol node, the IWF further comprises:
- a Diameter protocol mapping unit, configured to map a received Diameter protocol message into an MAP protocol message;
- a first relationship setting unit, configured to configure the relationship between the one of the group consisting of the first address and the first identification and the MAP protocol node; and
- a second sending unit, configured to send the MAP protocol message to the MAP protocol node, wherein the one of the group consisting of the first address and the first identification corresponds to the MAP protocol node, wherein the one of the group consisting of the first address and the first identification information is included in the received MAP protocol message as destination information.

20. The IWF of claim 18, when the one of the group consisting of the second address and the second identification corresponds to the MAP protocol node, the IWF further comprises:
- a Diameter protocol mapping unit, configured to map a received Diameter protocol message into an MAP protocol message;
- a second relationship setting unit, configured to assign the one of the group consisting of the second address and the second identification to the MAP protocol node, and assign the relationship between the one of the group consisting of the second address and the second identification, and the MAP protocol node, when the message mapping is required; and
- a third sending unit, configured to send the MAP protocol message to the MAP protocol node to which the second address or the second identification corresponds, wherein the second address or the second identification information is included in the received MAP protocol message as destination information.

* * * * *